US009021030B2

(12) United States Patent
Chakra et al.

(10) Patent No.: US 9,021,030 B2
(45) Date of Patent: Apr. 28, 2015

(54) SELECTIVE DELIVERY OF CONTENT VIA ELECTRONIC MAIL

(75) Inventors: Al Chakra, Apex, NC (US); Devon Clarke, Dublin (IE); Liam Harpur, Dublin (IE); John Rice, Waterford (IE)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 13/172,894

(22) Filed: Jun. 30, 2011

(65) Prior Publication Data

US 2013/0007140 A1    Jan. 3, 2013

(51) Int. Cl.
G06F 15/16    (2006.01)
H04L 12/58    (2006.01)
G06Q 10/10    (2012.01)

(52) U.S. Cl.
CPC .............. *H04L 51/14* (2013.01); *G06Q 10/107* (2013.01)

(58) Field of Classification Search
None
See application file for complete search history.

(56) References Cited

U.S. PATENT DOCUMENTS

| | | | |
|---|---|---|---|
| 6,185,684 B1 | 2/2001 | Pravetz et al. | |
| 6,237,099 B1 | 5/2001 | Kurokawa | |
| 6,769,002 B2* | 7/2004 | Ayan | 1/1 |
| 6,810,408 B1* | 10/2004 | Bates et al. | 709/200 |
| 7,353,256 B2 | 4/2008 | Delaney et al. | |
| 7,406,507 B2 | 7/2008 | Piccioni | |
| 7,529,940 B1 | 5/2009 | Winkel et al. | |
| 7,672,999 B2 | 3/2010 | Basson et al. | |
| 7,730,140 B2 | 6/2010 | Braun et al. | |
| 7,774,408 B2* | 8/2010 | Sinha et al. | 709/206 |
| 7,831,669 B2 | 11/2010 | Braun et al. | |
| 7,890,593 B2 | 2/2011 | Chen et al. | |
| 7,895,263 B1 | 2/2011 | Kirchmeier et al. | |
| 8,095,601 B2 | 1/2012 | Hasha et al. | |
| 8,095,893 B2* | 1/2012 | Stewart | 715/853 |
| 8,352,560 B2* | 1/2013 | O'Sullivan et al. | 709/206 |
| 8,370,948 B2* | 2/2013 | Troyansky | 726/26 |
| 8,407,805 B2* | 3/2013 | Warrington et al. | 726/27 |
| 8,488,763 B2* | 7/2013 | Yap et al. | 379/202.01 |
| 8,655,939 B2* | 2/2014 | Redlich et al. | 709/201 |
| 8,694,593 B1 | 4/2014 | Wren et al. | |
| 2001/0037364 A1* | 11/2001 | Michalek et al. | 709/204 |

(Continued)

FOREIGN PATENT DOCUMENTS

| | | |
|---|---|---|
| DE | 102012209957 A1 | 1/2013 |
| GB | 2492441 A1 | 1/2013 |
| WO | 03046746 A1 | 6/2003 |

OTHER PUBLICATIONS

UK Patent Application GB1207278.1 Combined Search and Examination Report, Aug. 15, 2012, 10 pgs.

(Continued)

*Primary Examiner* — Greg C Bengzon
(74) *Attorney, Agent, or Firm* — Cuenot, Forsythe & Kim, LLC

(57) ABSTRACT

A method that includes identifying a first electronic mail (email) addressed to at least two groups of recipients, the first email comprising content. The method further can include communicating the first email comprising the content to a first group of recipients. The method also can include generating a second email different than the first email and not comprising the content, the second email comprising information that indicates a contact that the second group of recipients are to contact regarding subject matter associated with the first email, and communicating the second email to a second group of recipients.

14 Claims, 5 Drawing Sheets

(56) References Cited

U.S. PATENT DOCUMENTS

| | | |
|---|---|---|
| 2002/0013817 A1* | 1/2002 | Collins et al. .............. 709/206 |
| 2002/0082894 A1* | 6/2002 | Azuma ........................ 705/8 |
| 2002/0116242 A1 | 8/2002 | Vercellone et al. |
| 2002/0178229 A1 | 11/2002 | Sinha et al. |
| 2005/0108351 A1 | 5/2005 | Naick et al. |
| 2006/0015564 A1* | 1/2006 | Angelica .................... 709/206 |
| 2006/0041624 A1 | 2/2006 | Lyle et al. |
| 2006/0248175 A1 | 11/2006 | Jinks et al. |
| 2007/0192465 A1 | 8/2007 | Modarressi |
| 2007/0226300 A1* | 9/2007 | Smith et al. ................. 709/206 |
| 2008/0168135 A1* | 7/2008 | Redlich et al. .............. 709/204 |
| 2008/0189162 A1 | 8/2008 | Ganong et al. |
| 2008/0222257 A1 | 9/2008 | Mukherjee et al. |
| 2008/0301227 A1* | 12/2008 | Clayton ...................... 709/204 |
| 2009/0049134 A1* | 2/2009 | Kumhyr et al. ............. 709/206 |
| 2009/0077045 A1 | 3/2009 | Kirchmeier et al. |
| 2009/0131088 A1* | 5/2009 | Kirchmeier et al. ........ 455/466 |
| 2009/0171744 A1 | 7/2009 | Hake et al. |
| 2009/0198777 A1* | 8/2009 | LaFreniere et al. ......... 709/206 |
| 2009/0222382 A1 | 9/2009 | Kobza et al. |
| 2009/0265755 A1* | 10/2009 | Hamilton et al. ............ 726/1 |
| 2009/0319623 A1 | 12/2009 | Srinivasan et al. |
| 2010/0098231 A1* | 4/2010 | Wohlert ...................... 379/207.15 |
| 2010/0100600 A1* | 4/2010 | Thompson et al. .......... 709/206 |
| 2010/0229246 A1 | 9/2010 | Warrington et al. |
| 2011/0029622 A1 | 2/2011 | Walker et al. |
| 2011/0126126 A1* | 5/2011 | Blair ........................... 715/752 |
| 2012/0102114 A1 | 4/2012 | Dunn et al. |
| 2012/0116830 A1* | 5/2012 | Loring et al. ................ 705/7.14 |
| 2012/0179980 A1* | 7/2012 | Whalin et al. ............... 715/753 |
| 2012/0297316 A1* | 11/2012 | Ercegovic .................... 715/752 |
| 2013/0007154 A1 | 1/2013 | Chakra et al. |
| 2013/0304761 A1* | 11/2013 | Redlich et al. .............. 707/781 |

OTHER PUBLICATIONS

U.S. Appl. No. 13/533,101, Non-Final Office Action, Jun. 20, 2014, 18 pg.

* cited by examiner

400

```
┌─────────────────────────────────────┐
│   Identify a request from a trusted │
│ recipient to forward a first email to│
│  a non-trusted recipient, the first  │
│       email comprising content       │
│                                  402 │
└─────────────────────────────────────┘
                   │
                   ▼
┌─────────────────────────────────────┐
│  Generate a second email different   │
│  than the first email and not        │
│  comprising the content, the second  │
│  email comprising information that   │
│  indicates a contact that the        │
│  non-trusted recipient is to contact │
│  regarding subject matter associated │
│  with the first email                │
│                                  404 │
└─────────────────────────────────────┘
                   │
                   ▼
┌─────────────────────────────────────┐
│  Communicate the second email to the │
│        non-trusted recipient         │
│                                  406 │
└─────────────────────────────────────┘
```

FIG. 4

SELECTIVE DELIVERY OF CONTENT VIA ELECTRONIC MAIL

BACKGROUND

The embodiments disclosed within this specification relate to electronic messaging systems. More particularly, the embodiments relate to selective delivery of content via electronic mail (email).

Email systems are commonly used to facilitate the exchange of content among users, such as information presented in a body of an email or electronic files attached to an email. To mitigate the risk of such documents from being intercepted and viewed by unscrupulous parties, such documents oftentimes are encrypted. For example, documents oftentimes are encrypted with password protection. When a recipient receives such a document, the recipient usually is required to enter a password in order to view the document. Notwithstanding the level of security provided by the use of password protection, security continues to be a significant concern in those organizations that use email to facilitate the exchange of information.

BRIEF SUMMARY

One embodiment of the present invention can include, within a system that includes a processor and a memory, a method that includes, via the processor, identifying a first electronic mail (email) addressed to at least two groups of recipients, the first email comprising content. The method further can include communicating the first email comprising the content to a first group of recipients. The method also can include generating a second email different than the first email and not comprising the content, the second email comprising information that indicates a contact that the second group of recipients is to contact regarding subject matter associated with the first email, and communicating the second email to a second group of recipients.

Another embodiment of the present invention can include, within a system that includes a processor and a memory, a method that includes, via the processor, identifying a request from a trusted recipient to forward a first electronic mail (email) to a non-trusted recipient, the first email comprising content. The method further can include generating a second email different than the first email and not comprising the content, the second email comprising information that indicates a contact that the non-trusted recipient is to contact regarding subject matter associated with the first email, and communicating the second email to the non-trusted recipient.

Yet another embodiment of the present invention can include a computer program product including a computer-readable storage medium having computer-readable program code that, when executed, causes a machine to perform the various methods and/or functions described herein.

Another embodiment of the present invention can include a memory and a processor configured to perform various methods and/or functions described herein.

BRIEF DESCRIPTION OF THE SEVERAL VIEWS OF THE DRAWINGS

FIG. 4 is a flow chart illustrating a method of sending content via email in accordance with another embodiment of the present invention.

DETAILED DESCRIPTION

Figure 1:
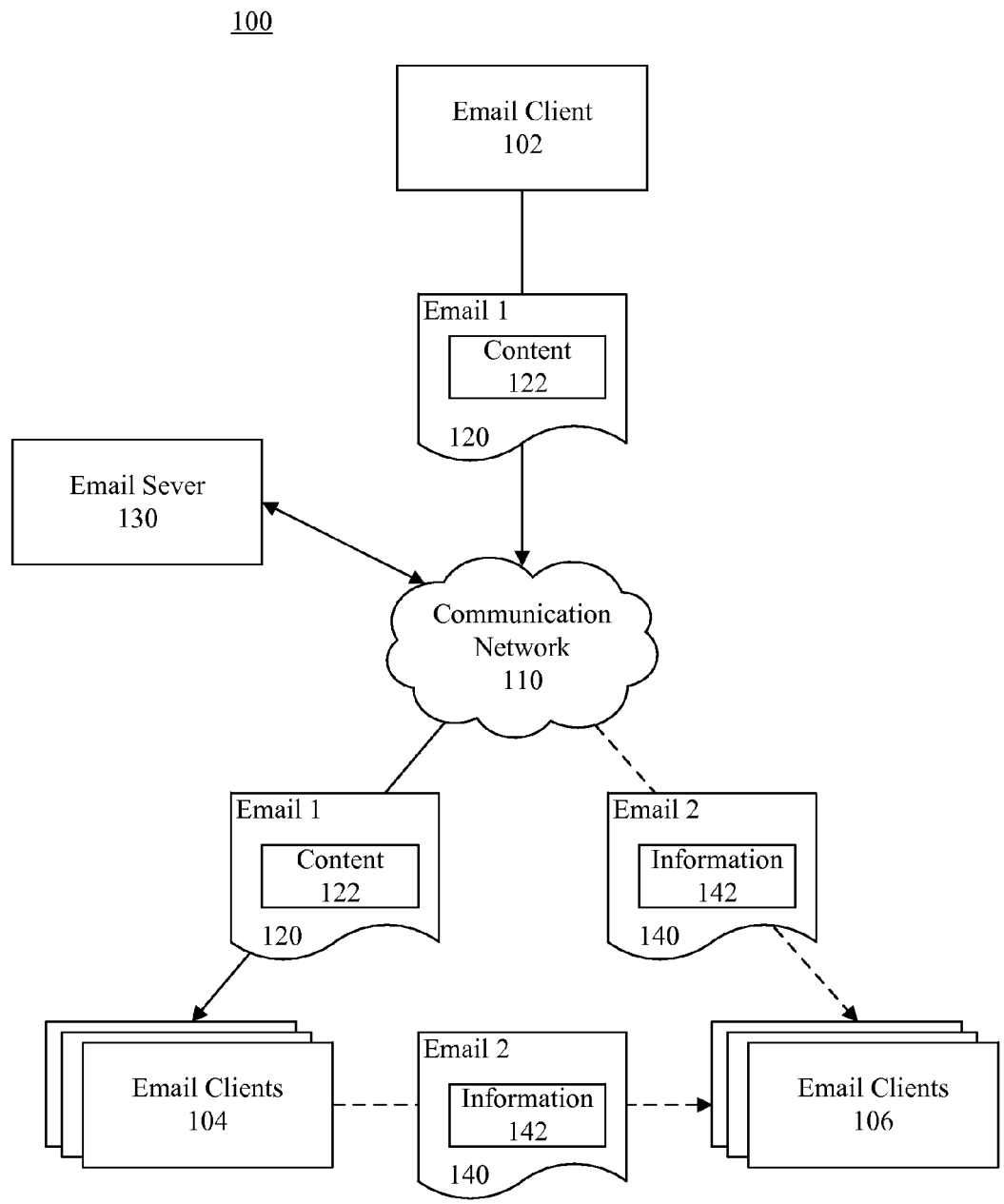
FIG. 1 is a Hock diagram illustrating a system for sending content via electronic mail (email) in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention relates to the sending of content, such as information in the body of an electronic mail (email) or an attachment to an email. More particularly, the present invention provides functionality that enables a user to provide content with an email, and send different versions of the email to different groups of recipients. For example, a first group of recipients can be sent a first email having the content, and such recipients can be provided access to the content. A second group of recipients can be sent a second email, which is different than the first email, that does not include the content. The second email can provide information to the second group of users that pertains to the first email. For example, within the second email, contact information can be provided to indicate to the second group of recipients who those recipients may contact to discuss information to which the email pertains. Further, the second email can indicate a suitable time when the second group of recipients may contact the person to discuss and/or receive information regarding subject matter associated with the first email. In one aspect, for example when there are many users identified in the second group of recipients, the email can be sent to different users, or groups of users, at different times.

FIG. 1 is a block diagram illustrating a system 100 for sending an email 120 comprising content 122 in accordance with one embodiment of the present invention. The system 100 can include a plurality of email clients 102, 104, 106, each of which are communicatively linked to a communication network 110. The communication network 110 can comprise a local area network (LAN), a wide area network (WAN), the Internet, and/or any other communication system through which emails may be communicated. As those skilled in the art will appreciate, the email clients 102-106 can be executed on any suitable devices, for example on computers, personal digital assistance, mobile telephones, or the like.

In operation, via the email client 102, a user can configure a first email 120 to be sent to a plurality of recipients, for example users associated with email clients 104, 106. The email 120 can include content 122. Such content 122 can be information presented in the body of the email 120 or an attachment to the email 120. Information presented in the body of the email can include alphanumeric text, graphics, or any other type of information that may be included within the body of an email. An email attachment can be any electronic file that may be transferred as an attachment to an email. For example, an email attachment can be an electronic document, a file comprising computer program code, etc. The first email 120 can be sent via an email server 130. Email servers are well known to those skilled in the art.

A user composing the email 120 can identify one or more recipients (a first group of recipients) to receive the content 122 and one or more recipients (a second group of recipients) that are not to receive the content 120. Such recipients can be those recipients deemed to be trusted with the content 122 sent with the email 120. As used herein, a recipient is a person to whom an email is directed. For the first group of recipients that are identified to receive the email content 122, the email 120 can be sent to those recipients. In illustration, the email 120 can be sent to email accounts for the first group of recipients, and the email clients 104 can retrieve the emails 120 for presentation to such recipients.

For the second group of recipients identified to not receive the content 122, for example non-trusted recipients, a second email 140 can be automatically composed, either by the email client 102 or the email server 130, and communicated to such recipients. In illustration, the second email 140 can be sent from the email client 102 to email accounts associated with the second group of recipients and the email clients 106 can retrieve the emails 140 for presentation to such recipients.

In another embodiment, rather than the email client 102 sending the second email 140 to the non-trusted recipients, trusted recipients who receive the first email 120 can elect to forward the email 120 to the non-trusted recipients. In illustration, when a trusted recipient chooses to forward the first email 120 to non-trusted recipients, the second email 140 can be automatically generated and sent to the non-trusted recipients in lieu of the first email 120. In one arrangement, any recipient to whom the first email is being forwarded can be considered a non-trusted recipient. In another arrangement, potential recipients of forwarded emails can be assigned security credentials. When the entail 120 is to be sent to a recipient, the recipient's security credentials can be accessed. Based on the security credentials, a determination can be made as to whether the recipient is categorized as being trusted or being non-trusted. If the recipient is trusted, the first email 120 can be forwarded to the recipient. If the recipient is non-trusted, the second email 140 can be forwarded to the recipient. The second email 140 can be generated by the email client 104 of the user who chooses to forward the email, or by the email server 130. Moreover, the email client 104 or the email server 130 can determine whether a recipient of a forwarded email 120 is trusted or non-trusted.

The second email 140 need not include the content 122. Instead, the second emit 140 can include information 142 that pertains to the first email 120. The information 142 can include contact information that indicates to the second group of recipients who may be contacted to discuss the email 140, or related matters. For example, if the content 122 is a new version of a computer program, the new version can be sent to only those users who are authorized to evaluate the new version. Nonetheless, via the email 140, other users can be informed that the new version of the computer program has been sent to those who will be evaluating it. Moreover, the email 140 can indicate to the other users who they may contact if they wish to participate in the evaluation process. In this regard, those wishing to participate may be asked to execute a confidentiality agreement prior to being given access to the computer program.

Further, the second email 140 can indicate a suitable time when the second group of recipients may contact the person to discuss and/or receive information to which the email 140 pertains. Notably, the recipients receiving the email 120 do not own or control the content 122. In this regard, other than the information provided in the second email 140, the second group of recipients will not be able to access the content 122, or any information related to the content 122, via the email 140.

In one aspect, for example when there are many users identified in the second group of recipients, the email 140 can be customized to indicate to a first subgroup of the users to contact the person at a first time, indicate to a second subgroup of the users to contact the person at a second time, indicate to a third subgroup of the users to contact the person at a third time, and so on. The subgroups can be defined in any suitable manner. For example, each of the recipients that are members of the second group of recipients can be assigned to a subgroup based on the recipient's respective level within an organizational hierarchy. In this regard, the second email 140 can be configured to automatically add a calendar entry pertaining to the information into respective electronic calendars of the second group of recipients.

Further, the second email 140 can be sent to different recipients, or subgroups of recipients, at different times. In illustration, recipients that are members of the second group of recipients can be classified into a plurality of subgroups. The email 140 can be sent to a first subgroup of recipients at first time, a second subgroup of recipients at a second time, and a third subgroup of recipients at a third time. Further the second email 140 can assign each subgroup of recipients a particular time at which to contact the person who is authorized to provide further information regarding the email 140. Thus, the risk of recipients inundating a person to be contacted in response to the email 140 being received can be minimized.

By controlling how the content 122 is distributed as described herein, the present invention mitigates the risk of unauthorized information leaks, thereby improving the security of electronic data.

Figure 2:
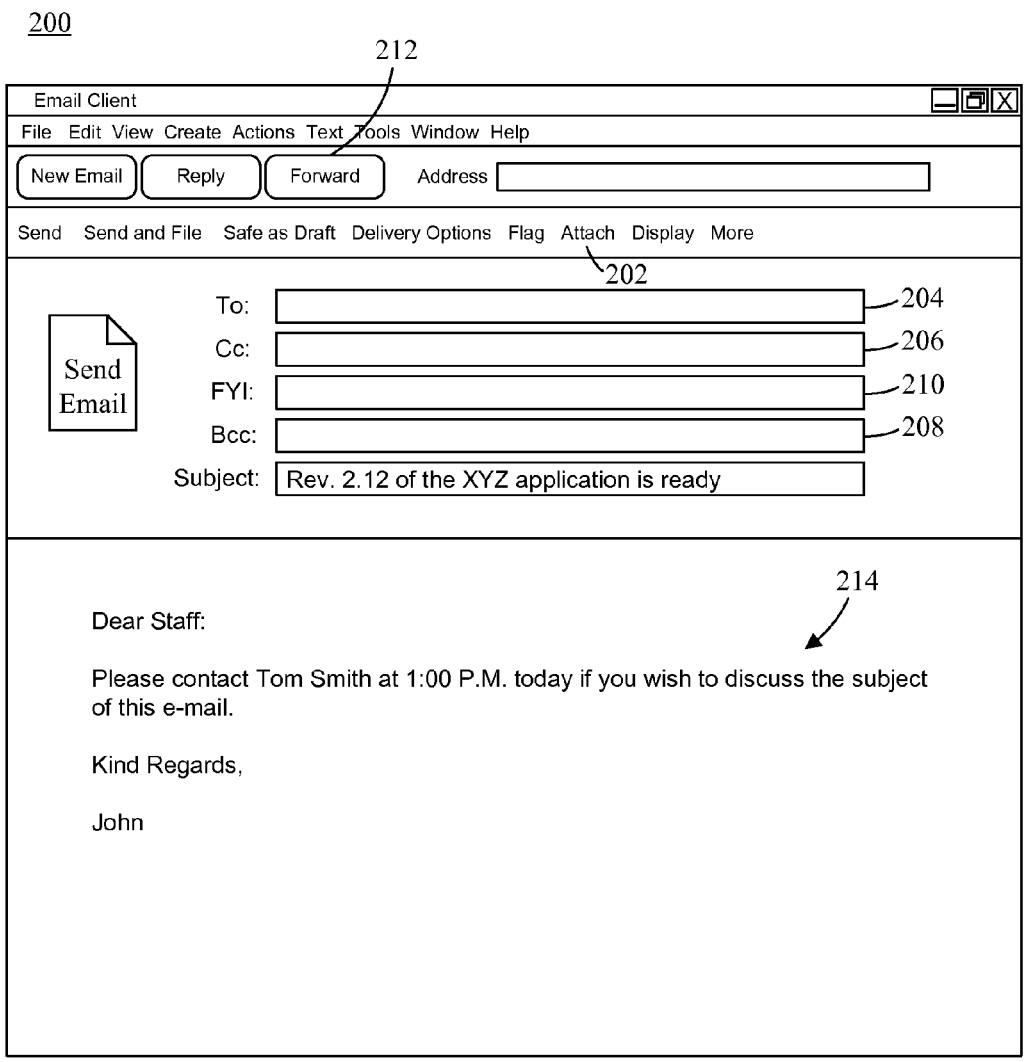
FIG. 2 depicts a view presented in an email client in accordance with an embodiment of the present invention.

FIG. 2 depicts a view 200 presented in an email client in accordance with another embodiment of the present invention. In the view 200, a user (e.g., an email sender) can be presented a number of options for composing an email, such as the email 120 of FIG. 1. At least one of the options can pertain to attaching an electronic file to the email so that the electronic file will be sent with the email. For example, an "Attach" selectable object 202 (e.g., a button or icon) can be presented in the view 200. The "Attach" selectable object 202 can be presented with text, graphics, or in any suitable manner. When a user selects the "Attach" selectable object 202, a menu (not shown) can be presented in the view 200, or over the view 200, to facilitate user selection of one or more electronic files to attach to the email. In response to the user selecting one or more electronic files, such electronic file(s) can be attached to the email. "Attach" selectable objects are well known to those skilled in the art. In another arrangement, the user can drag one or more user interface objects representing electronic files over the view 200 to cause such electronic files to be attached to the email, as also known to those skilled in the art.

In addition to conventional recipient fields, such as a "To" field 204, a "Cc" field 206, and a "Bcc" field 208, the view 200 can include a "FYI" field 210. In the "FYI" field 210, the user can identify e-mail recipients who are to receive the email, but not receive the content. E-mail recipients identified in the fields 204-208 can receive the content, however. In illustration, the email recipients identified in the fields 204-208 can receive the email as the email is originally composed by the sender of the email, including the content. E-mail recipients identified in the field 210 can be sent a second email that does not include the content. Further, the second email can include information relating to the first email. Such information can indicate who is to be contacted to receive further information regarding the first email and/or the content sent with the first email.

Further, when a trusted recipient who received the first email chooses to forward the first email to one or more non-trusted recipients, for example by selecting a "Forward" user interface object 212, the second email can be automatically generated and sent to the non-trusted recipients in lieu of the first email. The second email can be generated by the email client of the user who chooses to forward the email, or by the email server.

In one embodiment, at least part of the information provided in the second email can be automatically generated, for example by the email client 102 or the email server 130 depicted in FIG. 1. In illustration, rather than sending the body of the originally composed email, a new email body 214 can be automatically composed for the second email. The automatically composed email body 214 can indicate to the recipients of the second email who those recipients may contact to discuss the subject matter identified in the second email. The automatically composed email body 214 also can indicate to the recipients of the second email at what time they may contact the designated person. As noted, different recipients may be provided different contact times to ensure that the contact person is not inundated with information requests.

The second email can indicate recipients identified in the "To" field 204 and "Cc" field 206, though this need not be the case. Further, the second email also can indicate the recipients identified in the "FYI" field 210, but this also is not required.

Figure 3:
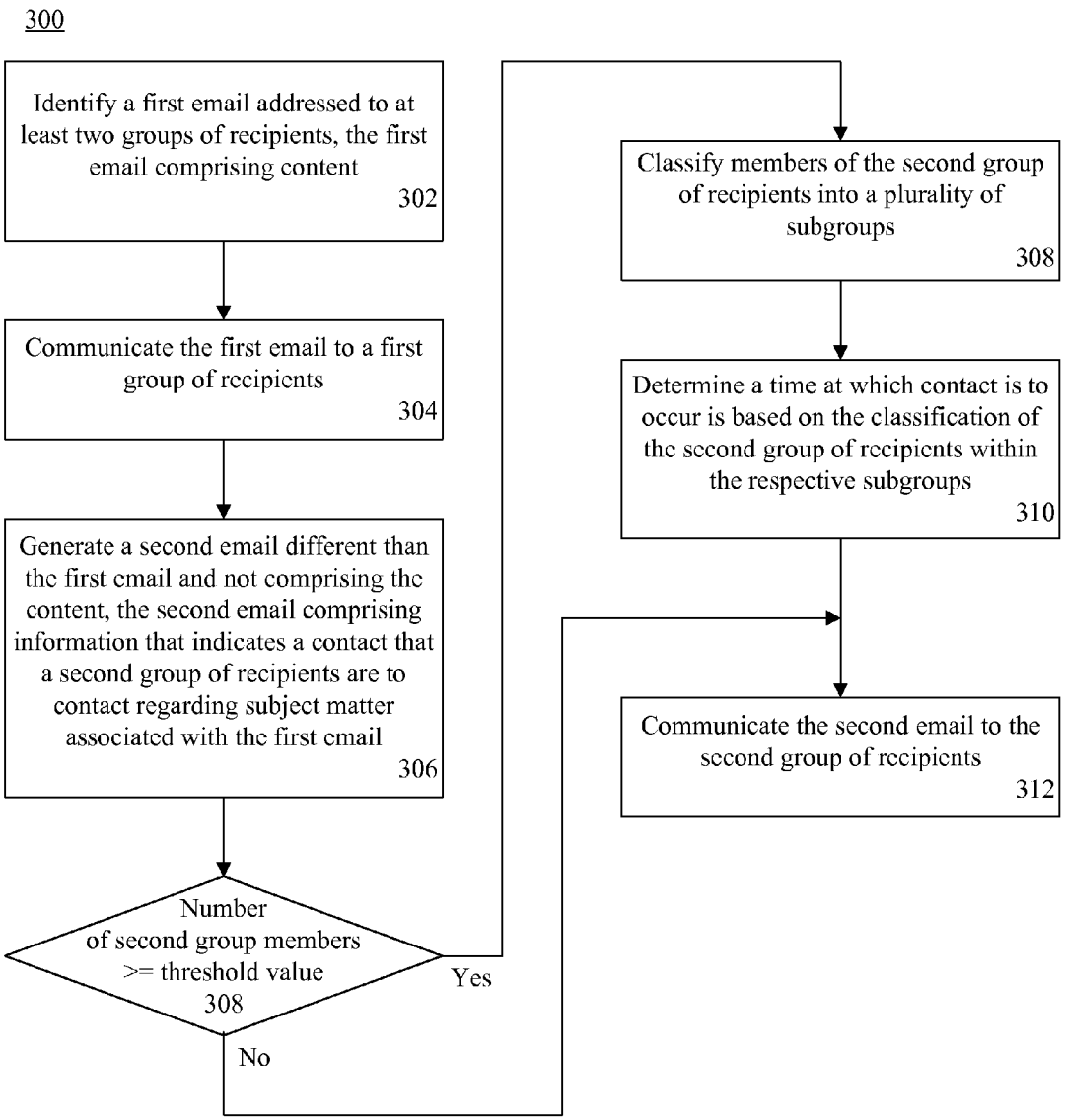
FIG. 3 is a flow chart illustrating a method of sending content via email in accordance with an embodiment of the present invention.

FIG. 3 is a flow chart illustrating a method 300 of sending content via email in accordance with an embodiment of the present invention. At step 302, a first email addressed to two groups of recipients can be identified. The first email can comprise content. At step 304, the first email can be communicated to a first group of recipients. The first group of recipients can include recipients that are trusted recipients. At step 306, a second email can be generated. The second email can be different than the first email and not include the content. Further, the second email can comprise information that indicates a contact that a second group of recipients are to contact regarding subject matter associated with the first email.

At decision box 308, a determination can be made as to whether a number of members in a second group of recipients exceeds a threshold value. The second group of recipients can be non-trusted recipients. If so, at step 308 members of the second group of recipients can be classified into a plurality of subgroups. For example, each of the members in the second group of participants can be associated with a respective level of an organization hierarchy, and the each subgroup can include members that are associated with a particular level. At step 310, a time at which contact is to occur can be determined based on the classification of the second group of recipients within the respective subgroups. Such time can be included within the second entails sent to the second group of recipients. More particularly, the second email can be customized for each subgroup to indicate to the members of that subgroup when they should establish contact with the designated entity (e.g., a person designated to be the contact). In one embodiment, the second email can be configured to automatically add a calendar entry corresponding to the time at which the contact is to occur into an electronic calendar of the non-trusted recipient.

Regardless of whether the members of the second group of participants are classified into a plurality of subgroups, at step 312 the second email can be sent to the second group of participants. In one embodiment, the second email can be sent to different subgroups at different times. In illustration, a subgroup comprising recipients who rank high in an organizational hierarchy can first receive the second emails, a subgroup comprising next highest ranking recipients can receive the second emails at a later time, and so on.

FIG. 4 is a flow chart illustrating a method 400 of sending content via email in accordance with another embodiment of the present invention. At step 402, a request from a trusted recipient to forward a first email to a non-trusted recipient can be identified. The first email can comprise content. At step 404, a second email different than the first email, and not comprising the content, can be generated. The second email can comprise information that indicates a contact that the non-trusted recipient is to contact regarding subject matter associated with the first email. The second email further can comprise information that indicates a time at which to the contact is to occur. The contact can be a designated entity, such as a person who is designated to be the contact. At step 406. The second email can be communicated to the non-trusted recipient. In one embodiment, the second email can be configured to automatically add a calendar entry corresponding to the time at which the contact is to occur into an electronic calendar of the non-trusted recipient.

Figure 5:
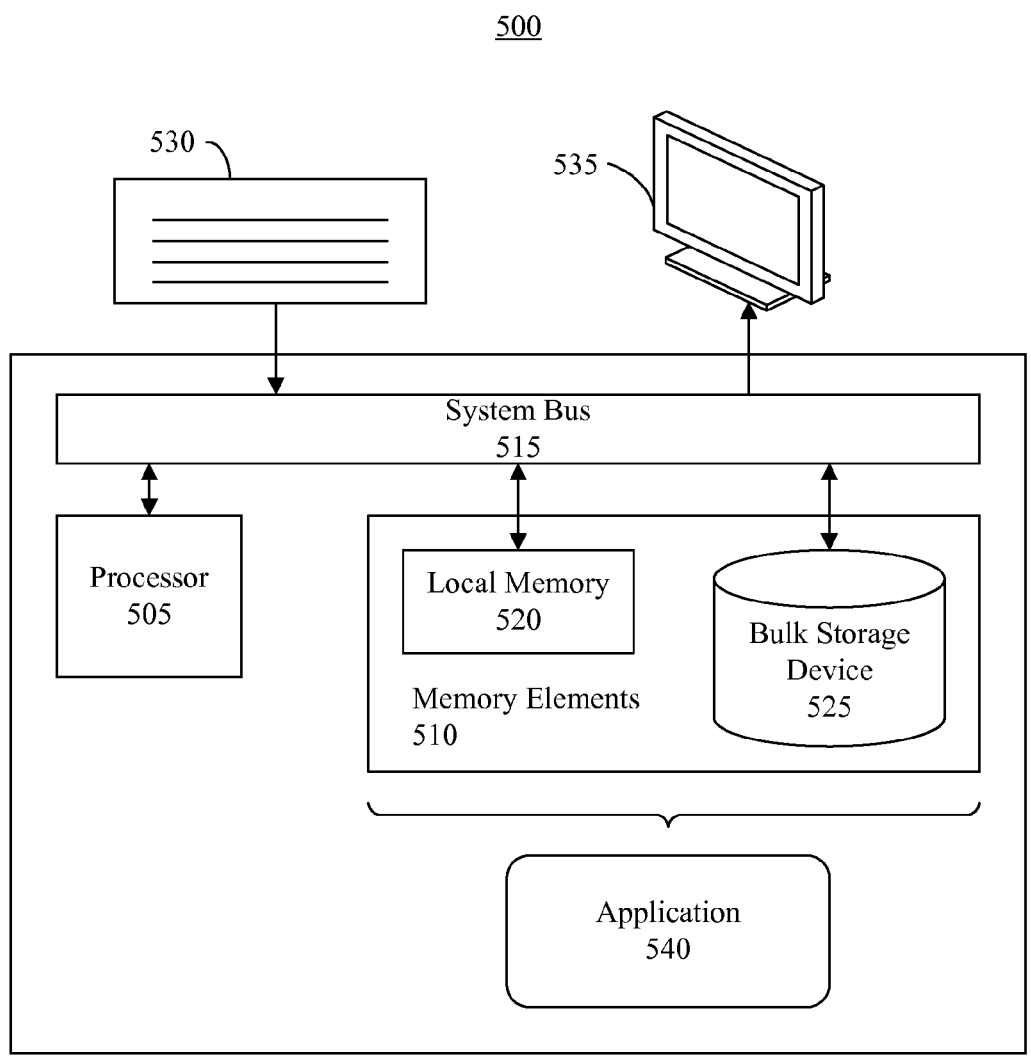
FIG. 5 is a block diagram illustrating a system for sending content via email in accordance with an embodiment of the present invention.

FIG. 5 is a block diagram illustrating a system 500 for sending content via email in accordance with an embodiment of the present invention. The system 500 can include at least one processor 505 coupled to memory elements 510 through a system bus 515. As such, the system 500 can store program code within the memory elements 510. The processor 505 can execute the program code accessed from the memory elements 510 via the system bus 515. In one aspect, for example, the system 500 can be implemented as computer that is suitable for storing and/or executing program code. It should be appreciated, however, that the system 500 can be implemented in the form of any system comprising a processor and memory that is capable of performing the functions described within this specification.

The memory elements 510 can include one or more physical memory devices such as, for example, local memory 520 and one or more bulk storage devices 525. Local memory 520 refers to random access memory or other non-persistent memory device(s) generally used during actual execution of the program code. Bulk storage device(s) 525 can be implemented as a hard disk drive (HDD), a solid state drive (SSD), or other persistent data storage device. The system 500 also can include one or more cache memories (not shown) that provide temporary storage of at least some program code in order to reduce the number of times program code must be retrieved from bulk storage device 525 during execution.

Input/output (I/O) devices such as a keyboard 530, a display 535, and a pointing device (not shown) optionally can be coupled to the system 500. The I/O devices can be coupled to the system 500 either directly or through intervening I/O controllers. Network adapters also can be coupled to the system 500 to enable the system 500 to become coupled to other systems, computer systems, remote printers, and/or remote storage devices through intervening private or public networks. Modems, cable modems, and Ethernet cards are examples of different types of network adapters that can be used with the system 500.

As pictured in FIG. 5, the memory elements 510 can store an application 540. The application 540, being implemented in the form of executable program code, can be executed by the system 500 to perform the processes and method described herein. The application 540 can be, for example, an email client having a plugin or other suitable program code that enables the email client to perform the functions and processes. In another example, the application 540 can be an email server having a plugin or other suitable program code that enables the email client to perform the functions and processes.

Like numbers have been used to refer to the same items throughout this specification. The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer program product comprising:
a computer-readable storage device having stored thereon computer-readable program code, the computer-readable storage device comprising:
computer-readable program code that identifies a first electronic mail (email) addressed to at least two groups of recipients, the first email comprising content;
computer-readable program code that communicates the first email comprising the content to a first group of recipients;
computer-readable program code that generates a second email different than the first email and not comprising the content within the first email, a body of the second email indicating a contact regarding subject matter associated with the content within the first email; and
computer-readable program code that communicates the second email to a second group of recipients.

2. The computer program product of claim 1, wherein the second email further comprises information that indicates a time at which to the contact is to occur.

3. The computer program product of claim 2, wherein the second email is configured to automatically add a calendar entry corresponding to the time at which the contact is to occur into electronic calendars of the second group of recipients.

4. The computer program product of claim 2, further comprising:
computer-readable program code that classifies members of the second group of recipients into a plurality of subgroups; and
computer-readable program code that determines the time at which to the contact is to occur is based on the classification of the members of the second group of recipients within the respective subgroups.

5. The computer program product of claim 4, further comprising
computer-readable program code that classifies the members of the second group of recipients within the respective subgroups based on an association of each member of the second group of recipients with a respective level of an organizational hierarchy.

6. The computer program product of claim 2, wherein the computer-readable program code that communicates the second email to the second group of the recipients comprises:
computer-readable program code that classifies members of the second group of recipients into a plurality of subgroups; and
computer-readable program code that determines the time at which to communicate the second email is based on a classification of the members of the second group of recipients within the respective subgroups.

7. The computer program product of claim 6, wherein the computer-readable program code that classifies the members of the second group of recipients into the plurality of subgroups comprises computer-readable program code that associates each of the members of the second group of recipients with a respective level of an organizational hierarchy.

8. The computer program product of claim 1, wherein the first group of recipients comprises trusted recipients and the second group of recipients comprises non-trusted recipients.

9. A computer program product comprising:
a computer-readable storage device having stored thereon computer-readable program code, the computer-readable storage device comprising:
computer-readable program code that identifies a request from a trusted recipient to forward a first electronic mail (email) to a non-trusted recipient, the first email comprising content;
computer-readable program code that generates a second email different than the first email and not comprising the content within the first email, a body of the second email indicating a contact regarding subject matter associated with the content within the first email; and
computer-readable program code that communicates the second email to the non-trusted recipient.

10. The computer program product of claim 9, wherein the second email further comprises information that indicates a time at which to the contact is to occur.

11. The computer program product of claim 9, wherein the second email is configured to automatically add a calendar entry corresponding to the time at which the contact is to occur into an electronic calendar of the non-trusted recipient.

12. A system comprising:
a memory; and
a processor configured to:
identify a first electronic mail (email) addressed to at least two groups of recipients, the first email comprising content;
communicate the first email comprising the content to a first group of recipients;
generate a second email different than the first email and not comprising the content within the first email, a body of the second email indicating a contact regarding subject matter associated with the content within the first email; and
communicate the second email to a second group of recipients.

13. The system of claim 12, wherein the second email further comprises information that indicates a time at which to the contact is to occur.

14. The system of claim 12, wherein the processor configures the second email to automatically add a calendar entry corresponding to the time at which the contact is to occur into electronic calendars of the second group of recipients.

* * * * *